Sept. 23, 1930.    N. P. CORNER    1,776,578
COOKING UTENSIL
Filed Dec. 7, 1928
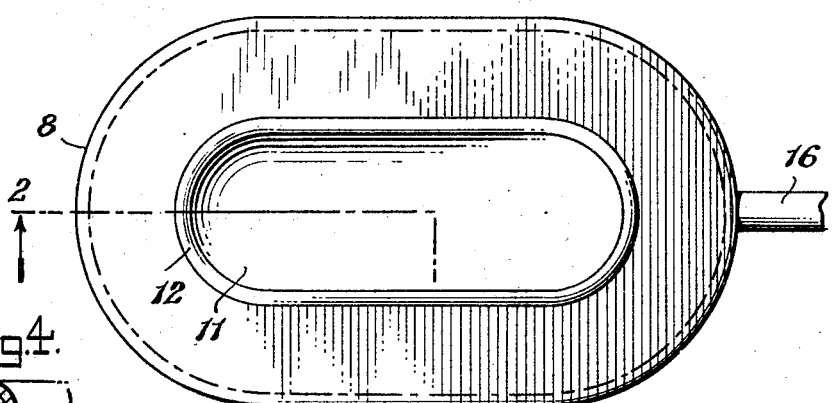
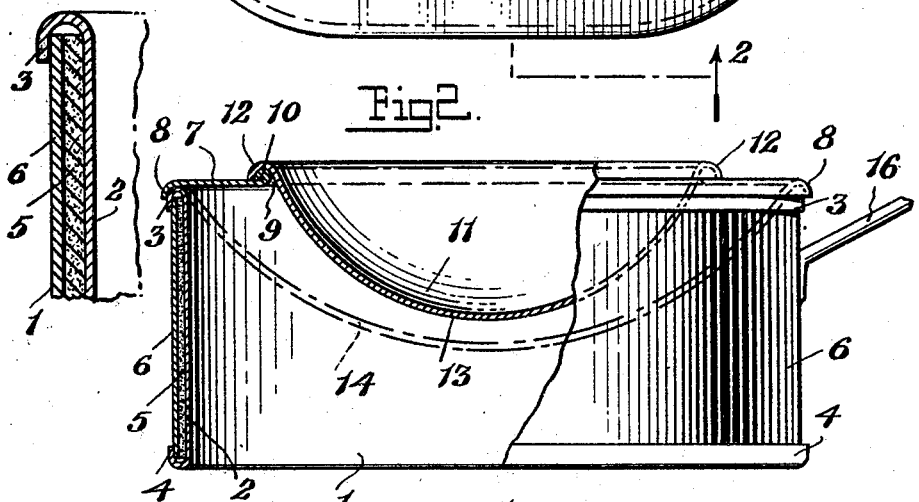
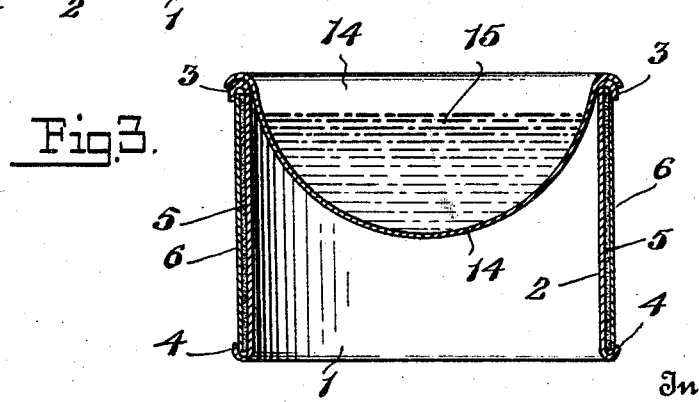
Inventor
Nat P. Corner
By his Attorney
Harry Radzinsky Patented Sept. 23, 1930

1,776,578

UNITED STATES PATENT OFFICE

NAT P. CORNER, OF NEW YORK, N. Y.

COOKING UTENSIL

Application filed December 7, 1928. Serial No. 324,370.

This invention relates to a novel form of cooking utensil, through the use of which it is possible to cook various foods at a far greater speed than that at which such foods are ordinarily cooked. Despite the rapidity with which the foods may be cooked, the same are found thoroughly palatable and in fact are more so than when the same are cooked by different methods.

A further object of this invention is to provide a new form of cooking utensil wherein a new process of cooking may be followed.

A still further object of the invention is to provide a type of utensil in which the capacity thereof may be readily varied to suit the articles to be cooked, without requiring the employment of a large number of vessels of different containing capacity.

A still further object of the invention is to provide a cooking utensil in which various articles of food are cooked in liquid animal or vegetable fat or shortening at a very high temperature. I have found that this method of cooking, which is extremely speedy, acts to retain in the foods very inherent good food qualities, which is not the case where foods are cooked at a comparatively low temperature for a great length of time.

With these objects and such other objects as may hereinafter appear, in view, I have devised the particular arrangement of parts hereinafter set forth and more particularly pointed out in the claim appended hereto.

Reference is to be had to the accompanying drawing, forming a part hereof in which Figure 1 is a plan view of my improved cooking utensil with its annular lid fitted in position to support the small receptacle or pan;

Figure 2 is a sectional view on the line 2—2 of Figure 1, looking in the direction of the arrows;

Figure 3 is a transverse sectional view of the utensil showing the larger pan or receptacle fitted in position on the supporting ring; and Figure 4 is a fragmentary sectional view of a portion of the supporting ring.

Throughout the various views of the drawings, similar reference characters designate similar parts.

In the embodiment of my invention disclosed in the accompanying drawing, 1 indicates the supporting ring. The same is composed of several thicknesses of material. An inner member 2 is preferably made of metal and the same is provided with turned over edges 3 and 4 which are outwardly turned to embrace a central asbestos layer or interlining 5 and an outer metal covering 6. A handle 16 projecting from the outer metal layer 6 is provided. If preferred, the inner layer 2 may be made of steel or some similar metal while the outer layer 6 may be of aluminum or some other metal which presents a satisfactory appearance under all conditions of use.

The inner layer or lining 5 which is disposed between the layers 2 and 6, is, as was previously explained, composed of asbestos or some similar heat-retaining substance. The supporting ring 1, just described, may be made of any suitable shape to accommodate pans or like receptacles of complementary shape. I have shown the same of elongated or oval form to accommodate pans of the same shape since many articles to be cooked, such as fowl, meats and the like are generally elongated in shape. It will be understood however, that the supporting ring 1 may be of any suitable shape according to the whim of the designer.

At 7 is shown an annular lid, the same being provided with a downwardly curled peripheral rim 8 which lies over the curled upper edge 3 of the supporting ring 1. This lid 7 is provided with a central opening 9, the edge of the lid thereabout being rolled or curled as at 10.

At 11 is shown a shallow pan or cooking receptacle which is provided with a curled rim 12. The receptacle 11 is of such size that the same snugly fits within the opening 9 in the lid 7 and has its curled edge 12 closely fitting over the rolled edge 10 which extends about the opening 9.

From the foregoing, the manner in which my improved cooking device is used will be readily understood. The supporting ring 1 is stood upon a stove or other source of heat with the lid and pan 11 fitted in position as shown in Figures 1 and 2. The pan 11 is filled with heated liquid fat. The nature of the ring 1 is such that it acts to concentrate the heat on the curved or rounded bottom 13 of the receptacle 11, thus causing the fat to be heated intensely. The food to be cooked is placed in the heated fat, which owing to its intense heat, very rapidly cooks the food. The cooking of the food takes place with such rapidity as to prevent the fat from entering the pores of the food to any great extent. On the other hand, it serves to seal the pores of the food and acts to retain the food qualities within the food. I utilize a smooth, rounded bottom on the pan or receptacle as the same, being without corners, permits a free, continuous circulation of the heated fat so that the same is uniformly heated throughout the entire capacity of the vessel. Where a larger vessel than that shown at 11 is desired, it is merely necessary to remove the pan 11 and the annular lid 7. A vessel similar in general shape to that shown at 11 but possibly of greater depth and greater diameter is placed in the ring 1 and is supported directly on its upper edge. Such vessel is disclosed at 11 in dotted lines in Figure 2 and in full in Figure 3.

In Figure 3, the heated liquid fat is disclosed within the vessel as at 15. The ring 1 acts to retain heat by reason of its metal lining 2 and asbestos interlining 5.

Through the construction just described, I am enabled to cook foods with approximately twice the speed and even faster than the time employed in cooking foods in the ordinary way.

Through the arrangement described, I provide a single supporting ring to accommodate vessels of varying sizes. If desired, a number of lids 7 may be employed so that any number of vessels of different sizes may be utilized in conjunction with the single ring. These and other embodiments are well within the spirit of my invention.

What I claim is:

A cooking utensil having a three-part ring-shaped supporting member composed of an inner metallic lining, an interlining of asbestos disposed externally of the inner metallic lining, and an outer metallic covering disposed over the asbestos interlining, said asbestos interlining and outer covering being maintained in position by outwardly and downwardly curled-over portions of the inner metallic lining, said portions being located at the upper and lower edges of the inner metallic lining, and a vessel having a smooth rounded bottom and a curled peripheral rim, said rim being adapted to removably seat upon the curled upper edge of the supporting member.

Signed at the city, county and State of New York, this 6th day of December, 1928.

NAT P. CORNER.